| | |
|---|---|
| [19] | [11] 4,396,993 |
| | [45] Aug. 2, 1983 |

United States Patent
Bahr et al.

[54] CONTROL CIRCUIT FOR A PRINTING HEAD OF A METAL PAPER PRINTER WITH ELECTRODES ARRANGED ON A SLOPE

[75] Inventors: Dietrich J. Bahr; Karl H. Burckardt, both of Herrenberg, Fed. Rep. of Germany

[73] Assignee: International Business Machines Corporation, Armonk, N.Y.

[21] Appl. No.: 257,294

[22] Filed: Apr. 24, 1981

[30] Foreign Application Priority Data

May 14, 1980 [DE] Fed. Rep. of Germany ....... 3018408

[51] Int. Cl.³ ............................................... G06F 3/12
[52] U.S. Cl. ..................................... 364/900; 364/710; 101/93.04
[58] Field of Search ....................... 364/900, 200, 710; 101/93.04, 93.05

[56] References Cited

U.S. PATENT DOCUMENTS

| | | | |
|---|---|---|---|
| 3,909,626 | 9/1975 | Balasubramanian | 364/710 |
| 3,986,011 | 10/1976 | Poole et al. | 364/200 X |
| 4,024,506 | 5/1977 | Spaargaren | 101/93.04 X |
| 4,131,940 | 12/1978 | Moyer | 364/200 |
| 4,163,285 | 7/1979 | Bahr et al. | 364/710 |
| 4,247,207 | 1/1981 | Klimek et al. | 101/93.04 X |

*Primary Examiner*—David H. Malzahn
*Attorney, Agent, or Firm*—K. P. Johnson

[57] ABSTRACT

A storage circuit for editing printing data for metal paper printers in which the printer has a plurality of spaced electrodes arranged on a slope. The data in binary form are to be recorded in a matrix of rows and columns and are supplied in columnar fashion to a register from which they are grouped and read into a storage with corresponding bit positions of the groups being stored concurrently during a write operation. An address control appropriately places the stored bits to accommodate the spacing between electrodes for the respective data bits.

10 Claims, 11 Drawing Figures

| FIG. 1A | FIG. 1B |
|---|---|

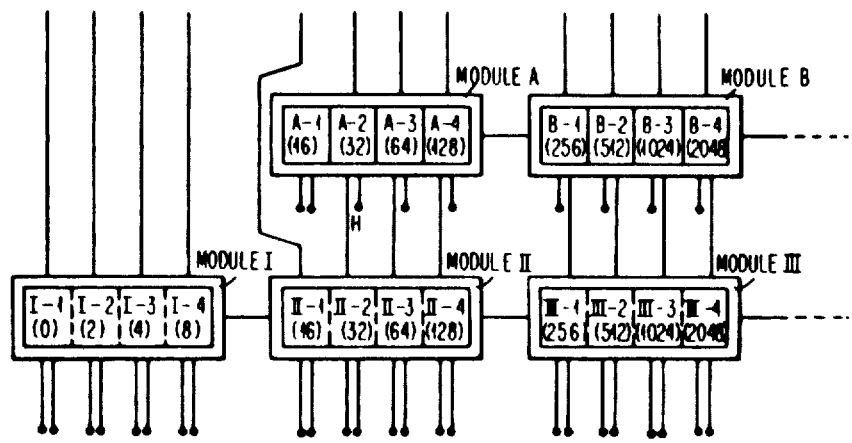

CONTROL CIRCUIT FOR A PRINTING HEAD OF A METAL PAPER PRINTER WITH ELECTRODES ARRANGED ON A SLOPE

BACKGROUND OF THE INVENTION

The invention relates to a control circuit for a printing head of a metal paper printer, with electrodes arranged on a slope.

The function of such control circuits is to edit stored information in such a manner that it is suitable for being printed by a print head with electrodes arranged on a slope.

German Offenlegungsschrift OS No. 27 15 889, of which U.S. Pat. No. 4,163,285 is a counterpart, describes such a control circuit. It is used for reproducing characters consisting of individual image elements and structured in matrix fashion according to image element rows and columns, said characters being provided in print image fidelity in a main storage, each electrode of the printing head being associated with an image element row, and the electrodes being staggered in horizontal projection by the D-fold of their electrode width. It is characterized in that a buffer storage addressable by row and column is provided for alternately receiving the information of a picture element column in a read-in phase, and supplying information in a read-out phase for controlling the electrodes, that the rows of this buffer storage are each associated with a picture element row or with a printing electrode, respectively, that the character information of the main storage can be read out by picture element columns, that during each read-in phase of the buffer storage the information of a picture element column of the main storage can be bit-serially applied to the buffer storage via a parallel-series converter, and that the individual bits corresponding to the picture elements can be written into the positions of the buffer storage which are addressable via a picture element row counter (5) with respect to their row address, and via an adder with respect to their column address, by means of which adder the product of a multiplication circuit which at its two inputs is connected to a register for storing factor D and to the character element row counter (5) for supplying its count, is added to the count of a counter (6), and that the counter (6) receives a count pulse via a flip-flop connected to a picture element character counter (5) after two cycles of this picture element row counter (5), and that during the read-out phases of the buffer storage one respective column of this buffer storage can be read out, the addressing of the individual bits being executable via the picture element row counter (5) for supplying the row address, and via the counter (6) for supplying the column address, and that during the read-out phases the multiplication circuit connected to the flip-flop is switched off.

As explained below in the specification with reference to FIG. 2A of the present patent application, this control circuit was relatively complex; furthermore, owing to the serial processing of the data to be entered into and read out of the buffer, the time required was considerable.

OBJECTS AND SUMMARY OF THE INVENTION

It is the object of this invention to avoid these disadvantages by providing a simpler control circuit having a higher data processing speed.

The foregoing object is accomplished in accordance with the invention by providing a plurality of storage means arranged to hold information bit-wise in rows and columns in matrix fashion with each row of data being associated with one of the electrodes, means for receiving a column of data for said storage means and address means for transferring the data in the column in parallel in groups of bits to a plurality of said storage means. The address means further comprise a cycle control providing an address that is modified for address registers to appropriately store the column data in the different columns of the storage means according to distance between electrodes.

BRIEF DESCRIPTION OF THE DRAWING

Information on prior art, and embodiments of the invention are shown in the drawings and will be described in detail below. The drawings show the following:

FIGS. 1A and 1B are together a schematic representation of the control circuit as disclosed by the invention for editing print information;

FIGS. 5A and 5B are a schematic representation for data compression for print data to be transferred;

FIG. 6 is a schematic representation of a 1 byte address control information within compressed print data according to FIG. 5; and FIG. 7 is a schematic representation of series-arranged addressing modules for controlling a buffer with shift function.

DESCRIPTION OF THE PREFERRED EMBODIMENTS

Figure 3:
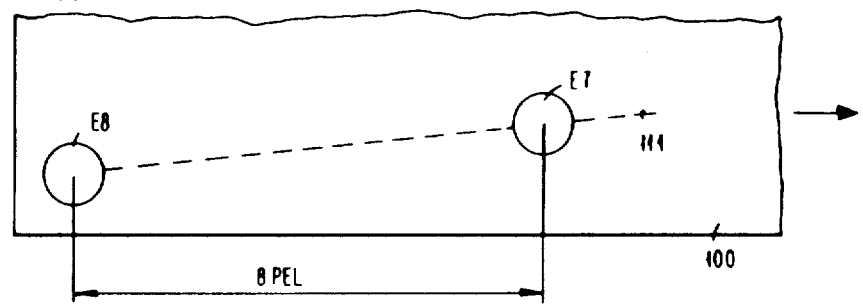
FIG. 3 is a schematic sectional drawing of a print head of a metal paper printer with electrodes arranged on a slope.

In FIG. 3, part of a print head of a metal paper printer is shown with electrodes arranged on a slope. The electrodes of print head 100 shown in a plan view have the reference numbers E8 and E7. The assumed slope carrying electrodes E8, E7, . . . has the reference number 111. During printing, the print head moves in arrow direction along a printing row. For emitting print information, a printing voltage is applied to the individual electrodes at corresponding time during which the metal paper is burnt out at these electrode spots and thus "printed on."

Each electrode thus has a "spot-shaped" share in the entire print. The information to be printed is first stored in print image fidelity similarly spot shaped (bit-wise) in a main storage of a central processing unit 1 (see FIG. 2A). As usual in computer-controlled metal paper printers, this stored information is transferred by central processing unit 1 via a control unit 2 to a row storage 3. In this row storage 3, the information is still to be maintained in print image fidelity, i.e. a corresponding editing of the information to be read out in consideration of the electrode slope of the print head is not yet effected at this time. This editing will be executed in a subsequent buffer storage 4 with shift function, from which the electrodes are supplied with print information.

Figure 2A:
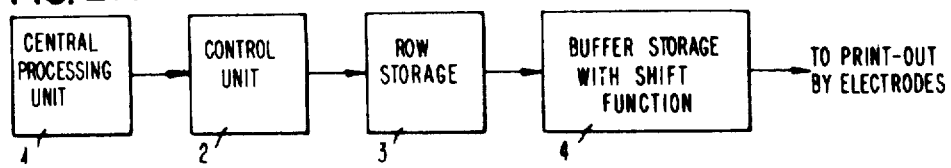
FIG. 2A is a schematic block circuit diagram representing the data flow between a central processing unit and the print head electrodes of a metal paper printer in accordance with German Offenlegungsschrift OS No. 27 15 889.

As mentioned above, this arrangement is highly complex from a circuit point of view; the serial information processing in the buffer furthermore requires a great amount of time. These disadvantages are avoided in accordance with the arrangement of FIG. 2B. The data flow from central processing unit 1 to control unit 2 is the same as in FIG. 2A, but row storage 3 and buffer 4 in FIG. 2A are combined into a row storage 5 with shift function in FIG. 2B. In this manner, no separate buffer 4 in FIG. 2A is required. However, a corresponding control of row storage 5 for address modification of the print information to be processed in this storage is to be provided. This information is to be edited such that its recording by the electrodes presents a correct print.

Figures 1, 1A:
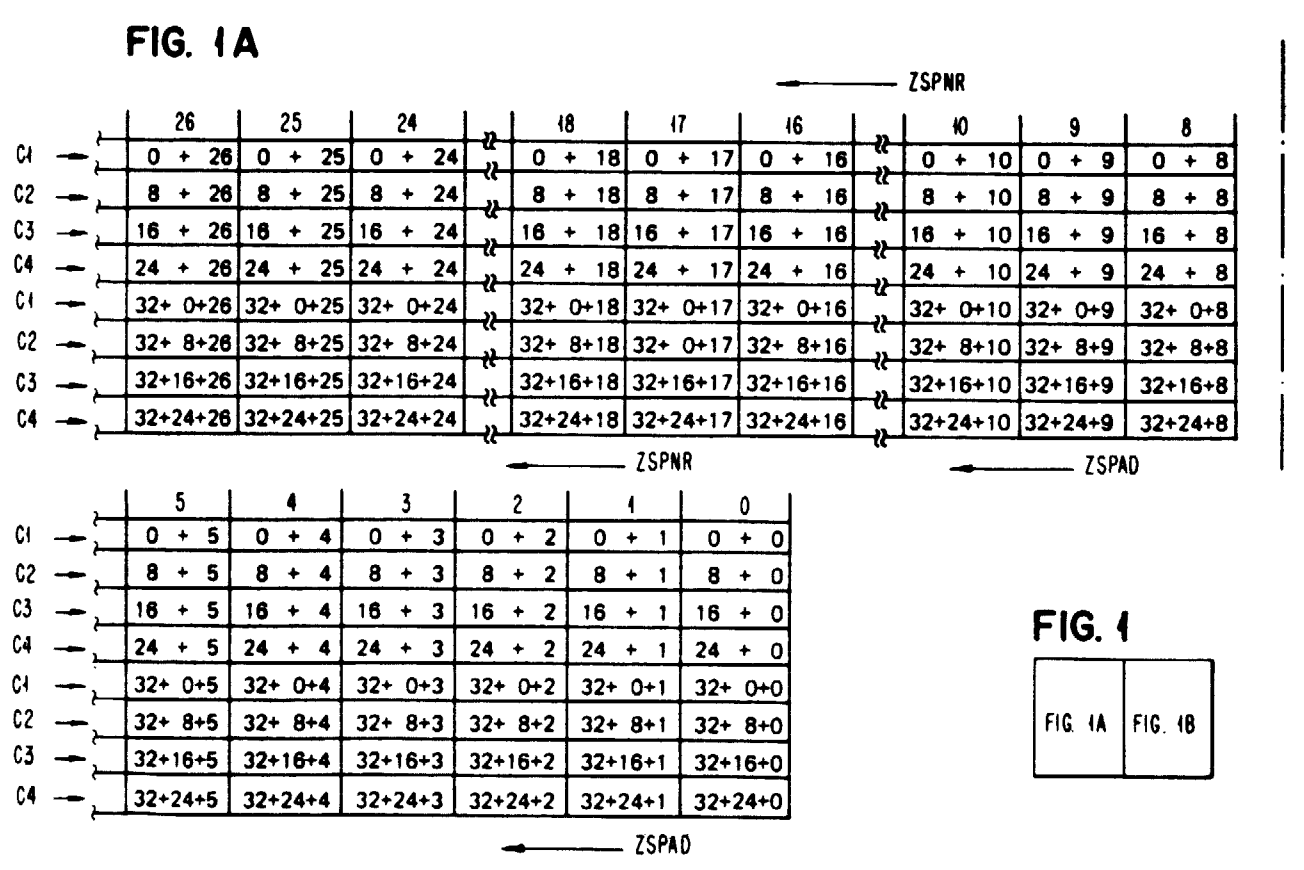
Figure 1B:
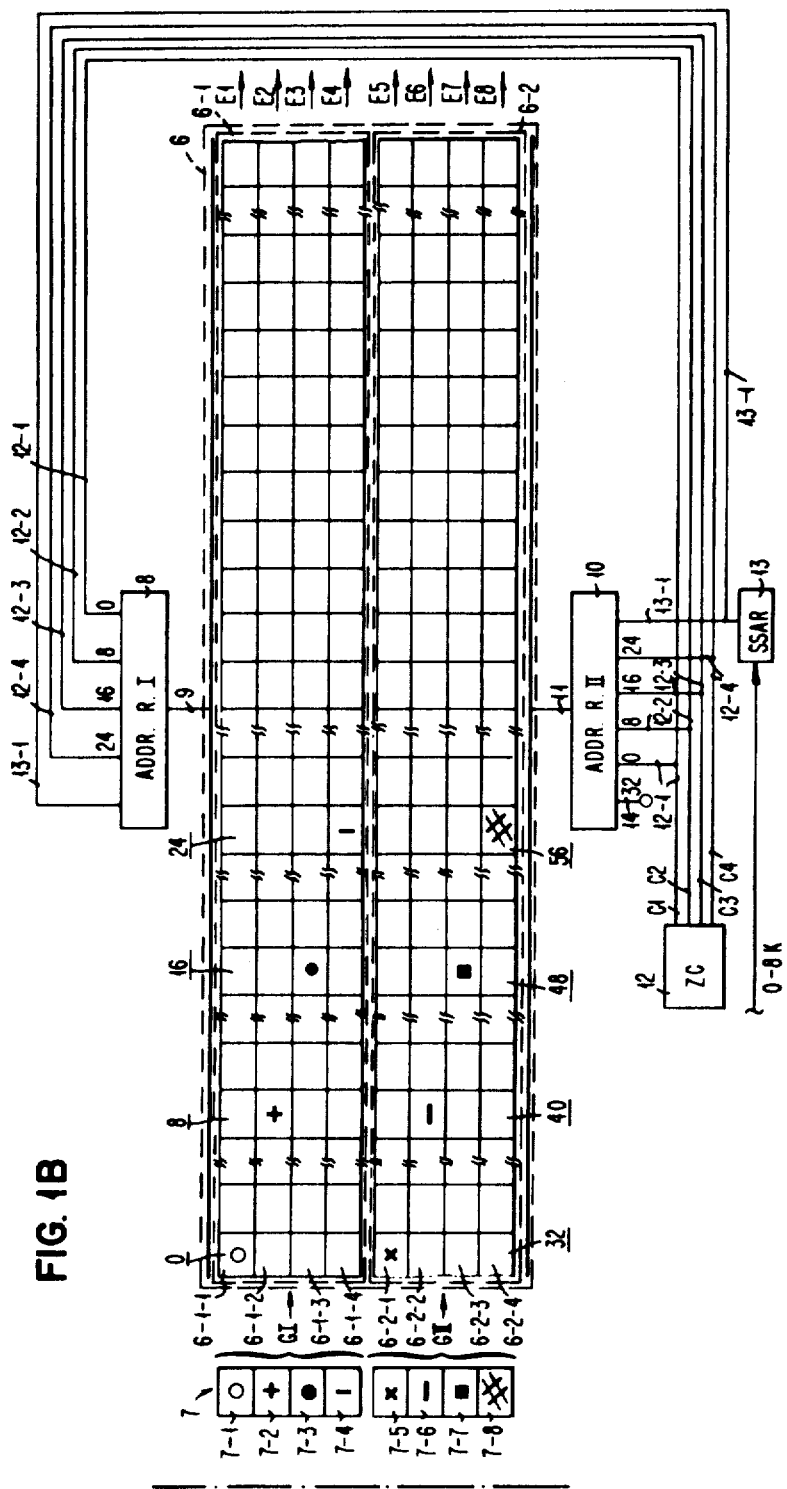

Details of this row storage 5 with shifting function are given in FIGS. 1A and 1B which for better understanding of the operation also give an address survey in table form for the bit structure of the information to be processed.

Figure 2B:
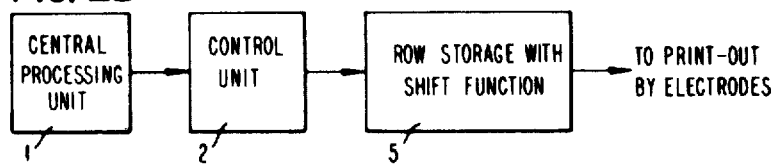
FIG. 2B is a schematic block circuit diagram representing the data flow between a central processing unit and the print head electrodes of a metal paper printer using the control circuit as disclosed by the invention.

As an example it is assumed that the print head shows eight electrodes (E1 to E8) which in their horizontal projection are provided at a distance of eight picture elements (8 PEL, see FIG. 3) from each other. This latter FIG. 8 (horizontal electrode staggering) is decisive for the address modification in the row storage 6 (FIG. 1B) which in FIG. 2B is marked 5. This row storage 6 is organized such that each of its rows has an associated electrode. For the information to be read into storage 6, the survey in table form gives for each bit the row storage address ZSPAD under which this bit is to be stored. It is assumed that this information is entered in character column form in the order of the character-column numbers ZSPNR 0, 1, 2, 3, etc. via register 7 into storage 6, and edited there accordingly. (The term "in character column form" is to indicate that the finished printed character consists of a number of points arranged in matrix fashion, and consequently of individual character columns). Storage 6 is composed of commercially available so-called one-bit storages. Such one-bit storages are available as 8K-, 16K-, 32K- storages etc. Such a storage corresponds to one respective row 6-1-1, 6-1-2, etc. in storage arrangment 6. Thus, storage arrangement 6 should be considered a parallel arrangement of several of such one-bit storages addressable by their column address (e.g. 0, 8, 16, etc.). This column address actually corresponds to the bit address of one single one-bit storage. Owing to the fact that each one of these one-bit storages receives its own writing instruction, in the order 6-1-1 in parallel to 6-2-1, 6-1-2 in parallel to 6-2-2, 6-1-3 in parallel to 6-2-3 and 6-1-4 in parallel to 6-2-4, each bit is addressable within the storage with the column address being given. It is pointed out here that the upper part of the storage containing the rows 6-1-1, 6-1-2, 6-1-3 and 6-1-4 is addressable separately from the lower part of storage 6-2 containing the rows 6-2-1, 6-2-2, 6-2-3, and 6-2-4. For the example of FIG. 1 of a printing row comprising 8000 character columns, eight one-bit storages with 8K each would have to be selected (in accordance with electrode number 8) to make the necessary storage arrangement.

Storage 6 is divided into an upper 6-1 and lower storage half 6-2. Each column of storage halves 6-1 and 6-2 is addressable through a column address. As pointed out above, the column addresses are marked by underline figures (e.g. 0, 8, 16, etc.). The storage column address for the upper storage half 6-1 is given via address register 8, the storage column address for the lower storage half 6-2 via address register 10. Each column of a storage half is to consist of four one-bit storage positions. The upper storage half 6-1 is organized in such a manner that with a given storage column address, the bit position in row 6-1-1 is addressed with a first write instruction, with a second instruction the bit position in row 6-1-2, with a third the bit position in row 6-1-3 and with a fourth the bit position in rows 6-1-4. A following (fifth) write instruction would refer again to row 6-1-1 etc. The addressing of the lower storage half 6-2 is performed accordingly.

For explaining the operation of the circuit shown in FIG. 1, reference is made to register 7. Into this register, the information for the individual character columns with the numbers ZSPNR 0, 1, 2, etc. is transferred successively. Each bit of a character column is transferred to the column address of the upper 6-1, or lower 6-2, storage half, as given in the individual table fields. It is made sure that each bit of such a character column has a corresponding associated storage row in storage 6. Thus, each bit of a character column has its own position defined by row and column address in storage 6. Contrary to the address data in the individual table fields, register 7 contains the contents for the various bit positions of a character column (not the address). For better understanding, and in view of the multitude of the individual bit positions the usual representation of the information by binary zeroes and ones has not been applied here. The contents of the upper bit position 7-1 is represented by a circle, the following bit position 7-2 by a plus symbol, bit position 7-3 by a filled-in circle, bit position 7-4 by a perpendicular line, bit position 7-5 by a multiplication symbol, bit position 7-6 by a horizontal line, bit position 7-7 by a filled-in square, and bit position 7-8 by a number symbol. Storage 6 indicates the positions for these individual bits (the addresses are given in the table column for the character column number ZSPNR, e.g. 0). The entering of the register information in storage 6 is governed by a specific principle and is adapted to the storage division into the two halves 6-1 and 6-2. The information in register 7 is divided into a group GI consisting of the four top bits 7-1 to 7-4, and into another group GII consisting of the four lower bits 7-5 to 7-8. The information of group GI is entered into the upper storage half 6-1, and that of group GII into the lower storage half 6-2. The entering of the information of those groups is effected bit-serially at the same time. This means that with a first writing instruction for 6-1 or 6-2 the information of the first bit 7-1 is entered into row 6-1-1 of storage column address 0, and the information of the fifth bit 7-5 into row 6-2-1 of storage column address 32. With the second writing instruction for 6-1 or 6-2, the information of the second bit 7-2 of the first group GI is entered in row 6-1-2 of storage column address 8, and the information of the sixth bit 7-6 of group GII is entered in row 6-2-2 of storage column address 40 etc., so that after the execution of the fourth writing instruction for the upper as well as for the lower storage half the information from register 7 has finally been distributed over storage 6, in such a manner that in the future read-out of this information from storage 6 to electrodes E1 to E8 print image fidelity is achieved. After the transfer of the information from a column of register 7 into storage 6, the character column with the next higher number is transferred into register 7 from which it is transferred again into storage 6 to those addresses of storage 6 that are given in the table under the corresponding character column number. According to the table of FIG. 1, the storage addresses for individual bits of the character columns ae formed following a specific system: for the bit positons of group GI, the address is obtained from the summation of the values 0 or 8 or 16 or 24 with the value of the character column number. The amount of the first summand is based on multiples of value 8, and thus to the horizontal electrode staggering. For the address formation for the bit positions of group GII, three summands are used: the first summand is the constant value 32 determined by the selection of the storage structure in connection with the horizontal electrode staggering. As the second summand there appears for each bit position the value zero or 8 or 16 or 24 decisive for group GI in the address formation of the bits. As the third summand there again appears the character column number for each bit position of group GII. The transfer of the information from register 7 into the two storage halves 6-1 and 6-2 is effected bit-wise in cycles C1, C2, C3 and C4. During a cycle, one respective bit of groups GI and GII is transferred simultaneously.

Reference will now be made to the circuit details ensuring a corresponding address modification during the write-in process. The storage column addressing of the upper storage half 6-1 is effected by address register 8, that of the lower storage half 6-2 by address register 10. To each of these registers 8, 10 a continuous storage column address is associated via lines 13-1 by storage column address register 13. The register count in register 13 is identical with character column number ZSPNR. The address capacity of register 13 is to correspond to the possible number of storage columns per print line (e.g. 8K). As the print head electrodes are staggered relative to each other by 8 PEL in horizontal projection, the fifth electrode E5 shows a horizontal staggering of 32 PEL relative to the first electrode E1. Due to this fact, address register 10 shows, in addition to input 13-1 of register 13, another input 14 via which address value +32 is applied. Furthermore, each of address registers 8 and 10 shows a number of further inputs 12-1 for value +0, 12-2 for value +8, 12-3 for value +16, and 12-4 for value +24. These values are multiples of the horizontal electrode staggering of 8 PEL. Input lines 12-1 for value +0 are activated during a first cycle 1, those (12-2) for value +8 during a cycle 2, those (12-3) for value (+16) during a cycle 3, and those (12-4) for value +24 during a cycle 4. For the activation of address register inputs 12-1 to 12-4 during the individual cycles a cycle control 12 is provided. As pointed out above, the information of the individual character columns is successively entered into register 7. From there, the information is processed in parallel in two groups GI and GII, the information of each group being entered serially into its associated storage half 6-1 or 6-2, respectively. In accordance with the above specifications, e.g. the input values for the information of the third bit 7-3 of group GI for the character column number 17 for address register 8 are the following:

| line | value |
|------|-------|
| 13-1 | 17 |
| 12-1 | 0 |
| 12-2 | 0 |
| 12-3 | 16 |
| 12-4 | 0 | i.e., the information of bit 7-3 of the character column with the number ZSPNR = 17 is transferred to address 16+17=33 of row 6-1-3. The representation of cycle control 12 with its four outputs C1 for cycle 1, C2 for cycle 2, C3 for cycle 3, and C4 for cycle 4 has merely been given for explanation purposes. From a practical point of view, such a cycle control will be designed as a two-stage binary counter without the output line for count 0. Consequently, only two output lines for values +8 and +16 would be necessary, value +24 being indicated by the combination of these two first-mentioned output lines. After cycle 3 for value +24 there would be a carry signal in the following count, which directed to register 13 would increase the content of this register by 1. This latter connection has not been shown in FIG. 1 for better understanding.

The system clock of the circuit is used for switching forward cycle control 12. The carry pulses of cycle control 12 realizable as a two-stage binary counter are in turn used for switching forward register 13. Compared with address register 8, address register 10 has a further input 14 for value +32. The representation of register 8 and 10 in FIG. 1 with several inputs is to be seen basically only. Such address registers can practically be made of several commercially available address modules.

FIG. 7 shows how to effect a storage addressing by means of so-called four-bit address modules. A problem of such addressing is that each stage of such a four-bit address module cannot show more than two inputs. It would therefore be impossible to provide one single stage of three inputs, one e.g. for the constant value +32, another for a storage column address, and a third for a value, considering the slope of the electrodes (in the example of FIG. 1. the latter value would be equal to the quantity +0 or +8 or +16 or +24 to be given during cycles C1 to C4). The arrangement of FIG. 7 consists of several series-arranged modules I, II, III, etc. Module I shows stages I-1, I-2, I-3, I-4, associated with value stages (0), (2), (4), and (8). Each stage has two address inputs and one output. The same applies analogously to module II and module III following module I, the individual counter stages II-1, II-2, II-3, II-4, III-1, III-2, III-3, III-4 being associated with values stages (16), (32), (64), (128), (256), (512), (1024), (2048). The addition logic of such four-bit address modules is conventional and therefore not shown in detail. The address processes are effected per stage, carries to the next higher value stage or to the following module are considered accordingly. In order to consider also the constant value +32 (line 14 in FIG. 1) in addressing, e.g. storage 6-2, the series arrangement in FIG. 7 of modules I, II, and III is to be extended. For this purpose, a further series arrangement of other modules A, B, etc. is provided. Module A consists of binary stages A-1, A-2, A-3, A-4 with the value assignments (16), (32), (64), (128). The output lines of stages II-2, II-3, and II-4 of module II form input lines for stages A-2, A-3, A-4 of module A. The second input line H for stage A-2 is activated when the constant value +32 is to be added. All other input lines of module A are not activated. Stage A-1 of module A remains unused because no third value is to be added to the output line of stage II-1 (in a circuit according to FIG. 1). Owing to carries in stage A-2 of module A, a further module B is arranged in series to module A, the individual stages B-1, B-2, B-3, and B-4 of this module B being connected to the corresponding output lines of stages III-1, III-2, III-3, and III-4 of module III. The respective second input line of the stages of module B remains unused; carries from module A to module B are accordingly considered module-internally. The respective end address is thus available at the output lines of module I, stage II-1 of module II, stages A-1 to A-4 of module A, as well as at the stages of module B etc. In such a series arrangement of four-bit address modules, any storage addressing is possible also for high addresses. After the entering of the information for an entire print line storage 6 (FIG. 1B), this information is read out to the individual electrodes E1 to E8 of the print head. The reading out of one respective column of the two storage halves 6-1 and 6-2 is effected simultaneously. During the reading out process lines 14, 12-1, 12-2, 12-3, and 12-4 of address registers 8 and 10 are not activated. With the character column number being given via register 13, the information is read out of the two storage halves 6-1 and 6-2.

Figure 4:
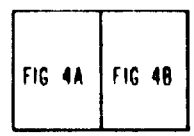
FIGS. 4A and 4B are together a schematic representation of a storage arrangement using a control circuit as disclosed by the invention for editing print information for print heads with a very high number of electrodes.
Figure 4A:
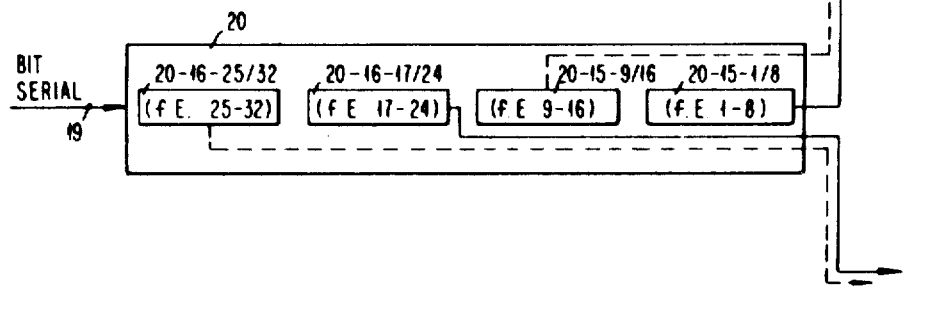
Figure 4B:
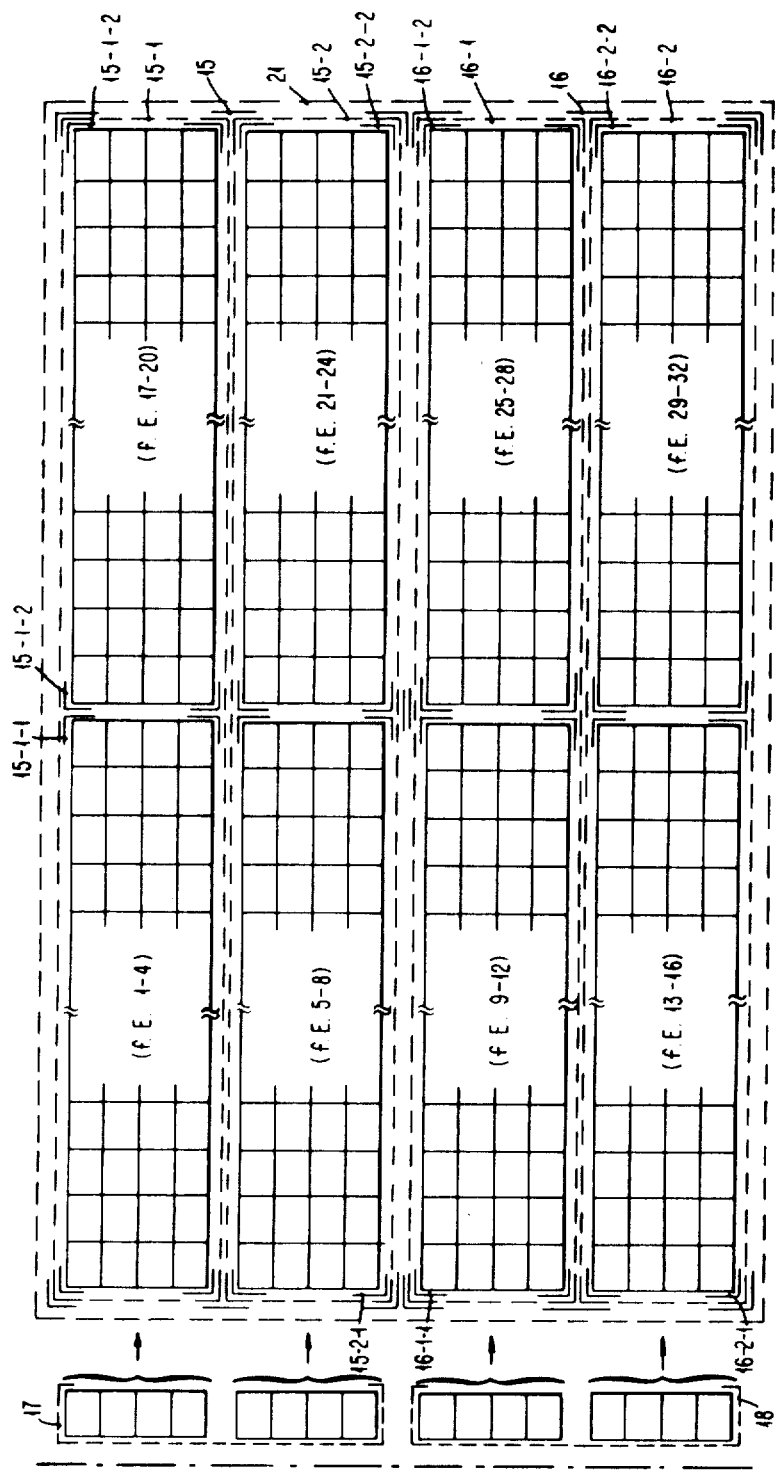

FIGS. 4A and 4B are schematic representation of a row storage 21 with shift function for a print head with a plurality of electrodes, i.e. 32. This storage 21 is to be composed of commercially available one-bit storages. As explained below, these one-bit storages are to have a capacity of 16K each. The one-bit storages are represented as rows in storage arrangements 21. Eight of these parallel arranged one-bit storages are respectively assembled to a so-called sub-group 15 or 16. Each of these sub-groups is divided into an upper and lower storage half 15-1; 15-2 or 16-1 and 16-2. The row length within these storage halves corresponds to the capacity of 16K of the one-bit storages used for the storage structure. Within the upper and lower storage half 15-1, 15-2, 16-1, and 16-2 there is a division into left and right storage parts which are marked 15-1-1, 15-1-2; 15-2-1, 15-2-2; 16-1-1, 16-1-2 and 16-2-1, 16-2-2, respectively. This storage division is applied for forming specific storage areas which are to receive the information for specific electrodes of the print head. The storage area 15-1-1 is associated to electrodes 1 to 4, storage area 15-2-1 to electrodes 5 to 8, storage area 16-1-1 to electrodes 9 to 12, storage are 16-2-1 to electrodes 13 to 16, storage area 15-1-2 to electrodes 17 to 20, storage area 15-2-2 to electrodes 21 to 24, storage area 16-1-2 to electrodes 25 to 28, and storage area 16-2-2 to electrodes 29 to 32. These individual storage areas are to receive the information for one entire line length. With a given line length of a total of 8K character columns, the use of this storage division has the obvious consequence that the one-bit storages used for this structure are to have a capacity of 16K each. Analogously to the representation in FIG. 1 each storage part 15-1, 15-2, 16-1, and 16-2 has its own address register for addressing. These address registers, however, are not shown so as to give a clear representation. Via these registers the individual storage areas are addressable with the corresponding column address being given, whereas the individual bits within the column address position are addressable through the sequence of write instructions for the individual rows of the storage parts 15-1, 15-2, 16-1, and 16-2 (analogously to storage 6, FIG. 1B).

The information is entered in this storage 21 in basically the same manner as described in connection with FIGS. 1A and 1B. The information to be entered in each storage group 15 and 16 comes from a register 17 or 18, respectively. In these registers, the information for a character column is received, and written into the various storage areas with corresponding addressing control, in the following manner:

In a first phase, register 17 receives the character column information for electrodes 1 to 8, at the same time register 18 receives the character column information for electrodes 9 to 16. After the entering of this information in the individual corresponding storage areas, register 17 receives the character column information for electrodes 17 to 24, during the same time register 18 receives the character column information for electrodes 25 to 32. As in FIG. 1, the information of each register 17, 18 is divided into two groups with 4 bits each. The entering of the information (phase 1) from register 17 into storage areas 15-1-1 and 15-2-1 follows the same principle as described in connection with FIG. 1. At the same time, the information is written from register 18 into storage areas 16-1-1 and 16-2-1. For the sake of a clear representation, the address modification during the writing process is not shown. This address modification, however, comprises an extension for the information of phase 2 which from register 17 is written into storage areas 15-1-2 and 15-2-2, or from register 18 into storage areas 16-1-2 and 16-2-2. The address of the addition address register for the various storage areas is additionally to be increased by 8K since the entire storage row length is divided into two equal parts with 8K each. The further applying of specific values to an adder register can be executed in accordance with the representation of FIG. 7.

The information to be provided which originates from the central processing unit is applied bit-serially on line 19 (FIG. 4A). The conversion of this bit-serial information into 8 bit-information suitable for entering in storage 21 is effected by means of conventional register arrangements 20 to which no further reference is made here. In arrangement 20, the information is organized in such a manner that it appears in respective 8-bit "groups" for electrodes 1 to 8, 9 to 16, 17 to 24, and 25 to 32. These individual 8-bit groups are marked 20-15-1/8, 20-15-9/16, 20-16-17/24, adn 20-16-24/32.

After the entering of the information for one entire print line into storage 21, this information is applied to the individual write electrodes. The specific division of the storage requires a read-out in two phases A and B. During the first phase A, with the column address for storage areas 15-1-1, 15-2-1, 16-1-1, and 16-2-1 being given, the information for electrodes 1 to 16 is read-out and buffered in an output register (not shown). The information for electrodes 17 to 32 not yet available for this column is read out during the second read-out phase B, with the corresponding column addresses being given, from storage areas 15-1-2, 15-2-2, 16-1-2, and 16-2-2 into the predetermined positions of the output register which subsequently supplies its overall information in parallel to the individual print electrodes associated to its positions.

Register arrangements 17, 18 shown in FIG. 4B can be simplified under certain conditions so that in the end only an 8-stage register for the addressing of storage 21 would be required. This simplification consists not only of saving one register but also of minimizing the addressing circuits required for the individual storage areas 15-1-1/15-2-1, 16-1-1/16-2-1; 15-1-2/15-2-2; 16-1-2/16-2-2. For each of these storage areas, the same addressing circuit could be used (of course, sucessively). (For simplification reasons, the given storage areas should be called in the following storage quarter).

However, this is only possible when in the data flow passing over the above mentioned then single register there are corresponding address indications used for addressing the storage quarters.

Reference will first be made to a possible compression of the data flow as shown in FIGS. 5A and B. In print data to be transferred, there frequently appear fields always containing the same information For saving transfer time and transfer capacity the data compression of such fields appears obvious. FIGS. 5A and 5B show the compression of such a field with binary zeroes (assuming that storage 21 according to FIG. 4B is available for data editing, and that only one register of a total of 8 bits is available for buffering the data to be entered in this storage). The beginning of the field with binary zeroes exclusively (see FIG. 5A) is given in the compressed form of the print data according to FIG. 5B with a character column IN which contains binary zeroes exclusively, too. The length of the field of binary zeroes in FIG. 5A is 13 character columns. This length is recorded (in binary encoding) in character column AD.FL following character column IN. With a data flow of a width of 8 bits, a total of 127 ($=2^7-1$) character columns could be recorded in such a way if the eighth bit remains reserved for other purposes. (If the data field to be compressed would extend over a number of more than 127 character columns the data IN and AD.FL would have to be repeatedly series-arranged in the compressed form). If now in a data flow of that type of compression there appears a character column with binary zeroes exclusively—which can be indicated by a corresponding detector circuit—the following AD.FL information would be used for a corresponding address branch through controlling the storage column address register for the addressing of the storage quarters.

If prior to starting the data transfer into storage 21 the latter would be cleared to binary zero exclusively, data fields containing binary zeroes only would no longer have to be written into this storage in the editing of the printing data. This feature is considered by the address branch mentioned above. The display for the appearance of binary zeroes exclusively in a character column, and the transfer of the subsequent field length information AD.FL to addition registers for the addressing of the storage quarters is part of the usual features so that no further reference need be made to it here. The character column following IN (FIG. 5B) can also contain another address indication, alternatively to the field length information, i.e. the storage quarter to be addressed. To differentiate between both methods, reference is made to the basic representation in FIG. 6. There, the individual bits of a 1 byte (8 bits) wide address information are shown. The lowermost stage (marked AB) contains the binary information on whether the information in the upper seven bits (with value stages (1) to (64) ) is a field length information, or an address indication for the storage quarter to be addressed. Data of this type are included in a program-controlled manner in the data flow to be compressed.

It is furthermore pointed out that if the above described data compression is used in connection with a storage 21 which is to be addressed only via one single 8-bit wide data register the data flow is to be organized in a specific manner. The information to be entered in the individual storage areas is to be provided block-wise in the order of its being read in (such a data block represents the entire information to be entered in the storage area).

What is claimed is:

1. A digital storage circuit for editing binary data bits for a print head moving along a print line on a recording medium in which said print head records said data in a matrix of rows and columns of data bits and includes a plurality of electrodes arranged on a slope and spaced from each other along the print line a predetermined number of data bit positions comprising;
   storage means for each said electrode for storing therein a row of data for the respective electrode, said storage means being organized in groups;
   register means having a plurality of stages for receiving a column of said data bits with said plurality of stages being grouped to correspond to said groups of storage means and each said stage temporarily holding data for a respective one of said storage means; and
   address means for transferring to each of said row storage means the data received in said respective one of said register stages with the data in corresponding register stages within each group being stored simultaneously and at an address in a said respective storage means equivalent to the number of data positions separating each said electrode from a first electrode.

2. Apparatus as described in claim 1 wherein said address means includes means providing an address count and means for adding a constant to the address count of the storage means in groups other than the first group for each executed group storage cycle.

3. Apparatus as described in claim 1 further including cycle control means in said address means for advancing the address for each group by a number equivalent to the electrode spacing from the previously stored group.

4. Apparatus as described in claim 3 wherein the output signals of said cycle control means are applied as a count advance signal for said address means.

5. Apparatus as described in claim 1 further including serial to parallel converter means for storing said data in said column register.

6. Apparatus as described in claim 1 wherein said electrode spacing is a multiple of the electrode diameter and the spacing between each adjacent pair of electrodes is uniform for all electrode pairs.

7. Apparatus as described in claim 1 wherein said storage means includes at least two series of groups and said address means includes means for storing data for at least a pair of groups in each series concurrently from said register means.

8. Apparatus as described in claim 7 wherein at least two said storage means are structurally joined to include sufficient capability of storing the row data for a pair of electrodes.

9. Apparatus as described in claim 7 wherein said register means includes a plurality of registers each associated with a group series.

10. Apparatus as described in claim 1 wherein at least two of said storage means are structurally joined and said address means is arranged to store columnar data for at least two said electrodes in said joined storage means.

* * * * *